United States Patent [19]

Rose

[11] 4,046,356

[45] Sept. 6, 1977

[54] PLASTIC FENCE POSTS AND ENCLOSURES

[75] Inventor: Byron W. Rose, Circleville Township, Pickaway County, Ohio

[73] Assignee: United States Steel Corporation, Pittsburgh, Pa.

[21] Appl. No.: 623,299

[22] Filed: Oct. 17, 1975

[51] Int. Cl.² ............................................. A01K 3/00
[52] U.S. Cl. .................................. 256/10; 174/158 F
[58] Field of Search ..................... 256/19, 10, 32, 65, 256/59; 174/158 F, 45, 149 R

[56] References Cited

U.S. PATENT DOCUMENTS

| 2,278,852 | 4/1942 | Hoffman | 174/45 R |
| 2,821,365 | 1/1958 | Lach | 256/19 |

Primary Examiner—Werner H. Schroeder
Assistant Examiner—Doris L. Troutman
Attorney, Agent, or Firm—John E. Callaghan

[57] ABSTRACT

Versatile plastic fence posts are provided by combining a front flange, rear flange and web with an integral support plate. Wire engaging lugs permit easy assembly of electric wire fence. The posts can also be used for line fence, with barb wire, or with woven wire fabric.

13 Claims, 7 Drawing Figures

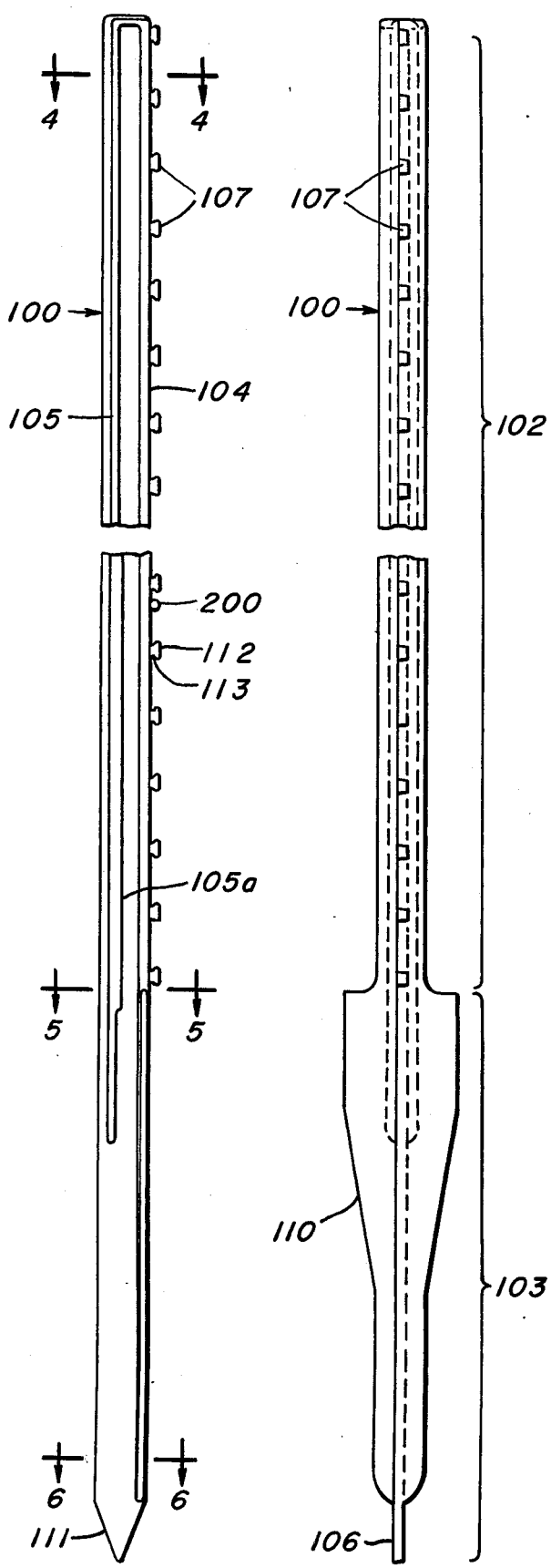
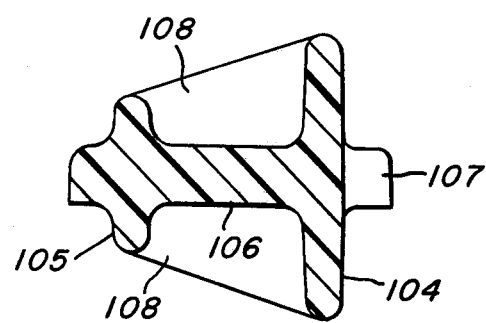
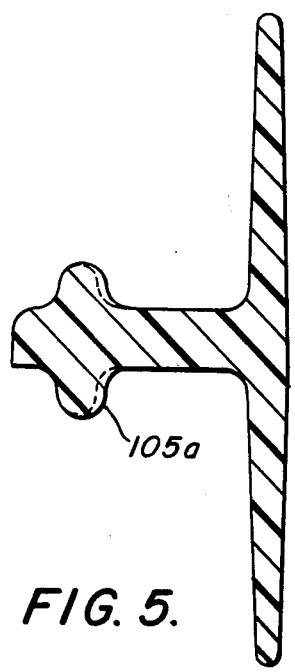
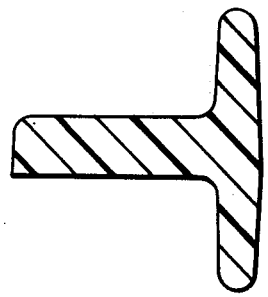
FIG. 2. FIG. 3. FIG. 4. FIG. 5. FIG. 6.

PLASTIC FENCE POSTS AND ENCLOSURES

BACKGROUND OF THE INVENTION

Animal enclosures in the form of fences are made from fence posts and wire. There are two classes of enclosures: permanent enclosures, e.g., posts are placed permanently and strung for extended restraint of the animals; temporary enclosures, where the fence line is moved after original erection. The principal types of wires used in both types of enclosures are line wire, barbed wire, electric wire and woven wire fabric. In keeping heavy animals, such as cattle, hogs, and sheep, the temporary enclosures are used for marking off pasture or feed lots. The permanent enclosures are used for penning these animals as well as domestic pets. The brushing of animals against fence posts, pushing of the animals on the wire materials, and action of corrosion from fertilizers causes difficult maintenance problems. In addition, the need for insulators with electric wire, the reuse of implanted posts and the durability for permanent posts require a variety of fence post types and designs. It is among the objectives of this invention to provide durable fence posts and enclosures with these posts where the fence post can be used for different types of enclosures. Particularly as applied to electric wire enclosures, it is an object of this invention to provide fence posts with improved wire engaging means so that insulators are unnecessary.

SUMMARY OF INVENTION AND DRAWINGS

The fence posts of this invention are injection molded thermoplastic resin members that have a front flange, a rear flange, a web and with an integral support plate toward the bottom of the member. With this assembly, the post when implanted can rebound from severe deflection, e.g., having the top bent through an arc of 90°, and yet the post can be reused. Enclosures of these posts with wire are thus available for even heavy animals. This invention is illustrated in the following figures.

FIG. 1 depicts an enclosure for cattle.
FIG. 2 is a left elevation of a fence post.
FIG. 3 is a front elevation of the fence post in FIG. 2.
FIG. 4 is a full cross section along the line 4—4 of FIG. 2.
FIG. 5 is a full cross section along the line 5—5 of FIG. 2.
FIG. 6 is a full cross section along the line 6—6 of FIG. 2.
FIG. 7 is an enlarged elevation of the wire engaging members shown in FIGS. 2 and 3.

DETAILED DESCRIPTION OF THE INVENTION

Figure 1:
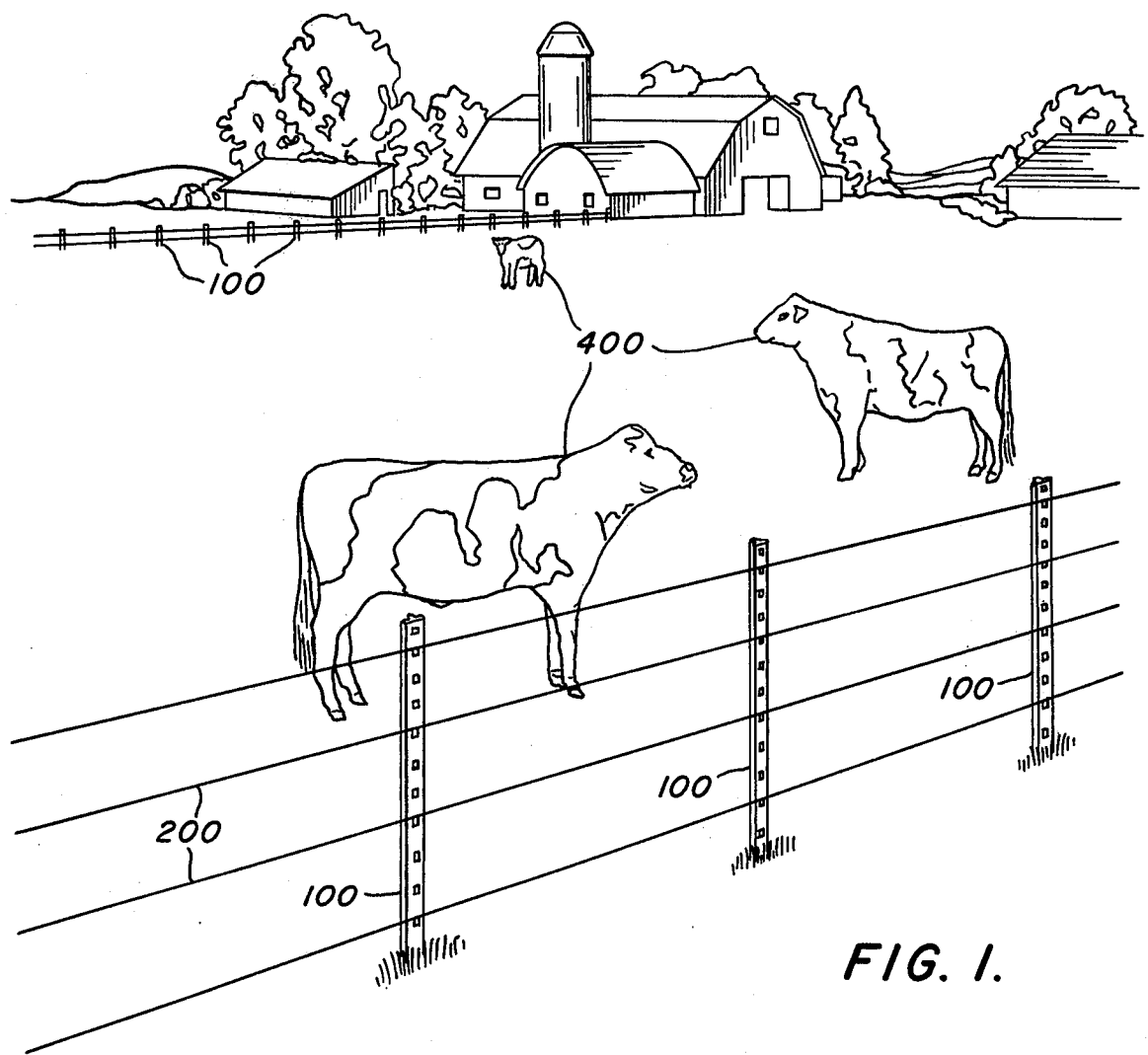

The fence posts are long columnar members made by injection molding thermoplastic resins. In length the posts may range from 4 to 7 feet. For fully implanted, permanent use, the post 100 as shown in FIG. 1 may be sunk up to the top of the integral support plate. With large animals such as cattle 400 the free end of the post may be about 5 feet. The shorter posts are also used for staking vegetables and on small trees.

Injection molding is a technique where molten thermoplastic resin is forced into a mold under high pressure and then cooled to form a shaped object; it is used for these posts to achieve the geometric shapes for this invention. The thermoplastic resin materials are especially those which are tough, have good chemical resistance and weatherability and are electrical insulators. Especially preferred are polyolefin resins, such as high density polyethylene, polypropylene and the like. These polyolefin resins are not much affected by acid or alkali. The posts of this invention can take particular advantage of these resins in that the posts can be planted in fields where the use of fertilizer or other chemicals cause acid or alkali attack and the post will provide long-lasting service. These may be solid resin materials or they may be partially foamed by the use of chemical blowing agents. Colorants and fillers may be present. The inorganic oxides and silicates are fillers that may be used in up to 30% by weight of the resin. Color coded posts can be made by suitable choice of coloring materials. The resin formulation is selected to give weights not in excess of four pounds, preferably 2.5 pounds, for posts 78 inch in length. Shorter posts will have corresponding lower weights.

The post 100 has a top section 102, and a bottom section 103. The top section is at least half of the total length of the post. The post illustrated in FIGS. 1-3 has an overall length of 78 inches with the illustrations approximately to scale in FIGS. 2-7. There is a front flange 104, a rear flange 105 and a web 106. The web extends from the front flange through to a short distance beyond the rear flange. For this length, the front flange would have a width of 1 inch; the rear flange, 13/16 inch; the web, 5/16 inch. The web ends 1/4 beyond the rear flange. Lateral thicknesses for the front flange and rear flange are 3/16 inch to 1/4 inch while that of the web is 5/16 inch. The rear flange has a width in the range of 0.15 to 0.75 times that of the front flange; this gives adequate stiffness to the post and yet does not interfere with the releasability of the post when used for making temporary enclosures. A preferred form of the rear flange has an additional thickened section 105(a). This will be approximately the thickness of the rear flange and will extend from the region of the top of the integral support plate up to about the middle of the member. This section increases the resistance of the member to deflection in the region around the ground level.

The combination of flanges and web have several important functions. When implanting the posts, the flanges being parallel to each other allow the post to be driven from the front side or the rear side without permanent distortion as the post moves into the ground. Along with the integral web, the flanges readily permit front or backside driving. Once implanted, this construction will allow the post to rebound to an upright position even if it is severely deflected.

The bottom section of the post contains at least one integral support plate 108 extending outwardly from one of the flanges, preferably the front flange 104. This integral support plate furnishes lateral support at ground level to the upright member. As shown, this plate has a rectangular section 109 and an adjacent trapezoidal section 110 converging towards the end of the flange. The area and shape of the integral support plate affects the force necessary to remove the post and to resist deflection in the ground. Where the trapezoidal section is at least as long as the rectangular section, it has been found that the post can be removed after implantation with relative ease yet the post will resist movement from deflection even in soft ground. In FIG. 3, the rectangular section is 3½ inches wide and 3 3/16 inches long; the trapezoidal section converges for a distance of 5¾ inches to the flange. Below the support plate, the front flange extends for another 5¼ inches.

The web extends the full length of the post and terminates with a pointed end in the bottom section. The web is thicker than the flanges and has its end shaped into a point. This has an advantage in that the longitudinal element with the heaviest cross section is bearing the rough treatment to which the point is subjected. The front flange with its support plate ends adjacent to the point of the web. The rear flange extends from the top of the post to a position intermediate the support plate, particularly in the upper half of the integral anchor plate. FIGS. 4, 5 and 6 show the corresponding cross sections of the post in the middle section, the upper half of the bottom section and the lower half of the bottom section.

The wire engaging members 107 project outwardly from the front flange. These members are used either as wire supports or as stops to restrain wire movement. The front flange, rear flange and web are dimensioned so that conventional U-shaped clips can be placed on the post from the rear and then bent to snugly hold the wire against the post; the typical dimensions are shown in FIG. 4. With the clips, both woven wire fabric and line wire can be fastened to the post. As shown by FIG. 2, the wire 200 will be held between adjacent engagement members 107. Where hogs are penned in an enclosure, this has the advantage that rooting by the animals can only move the wire a short distance along the post and the fence line is kept intact.

Figure 7:
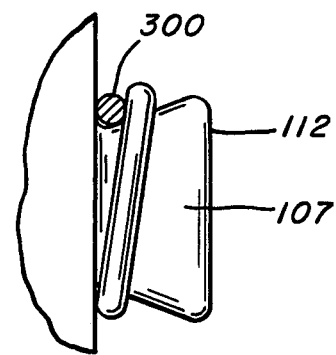

The preferred structure of the wire engagement member is shown in enlarged view in FIG. 7. This member has a width adjacent the front flange that is less than its width at a point 112 extending forwardly from the front flange. The inclination towards the front flange from this differential in widths is deep enough to engage the wire being strung between posts. As shown in FIG. 7, the wire can be simply wrapped around the member, and with electrified fence wire, these thermoplastic resin posts can be used without insulators to make an electrified fence. Because the post is injection molded, a preferred shape for the wire engaging member has continuously sloping upper and lower sides.

With this invention, enclosures can be made to hold cattle. By the action of the animals brushing, scratching or leaning against the fence posts, there is some deflection. The top of the implanted fence post may be bent to the limit of the wire fabric and by the features of this invention, it will rebound to an upright position, keeping the fence intact. The flexing in the free end of the post also causes lateral movement away from the animal; this deters cattle from using them as scratchers. The combination of the integral support plate, web and flanges gives good upright support to the post; vertical loads on the attached wire of as much as 200 pounds can be held with minimum deflection.

It can be seen that enclosures according to this invention may have a majority of their fence posts of the form described for this invention. Particularly, the straight line sections of the enclosures may have these plastic fence posts while at corner points, heavy section members may be used, such members are typically 8 inches dia. wood posts or their equivalent. Except electric wire enclosures, grounding may be provided by having interspersed steel fence posts or by providing ground wires or rods fastened to the wire portion of the fence. Thus, although this invention has been described in terms of a specific device, it is intended to encompass such variations in fence post design and enclosure structures as would appear routine to one of skill in the art.

I claim:

1. A releasable and reusable fence post capable of returning to an upright position when deflected after implantation comprising an injection molded thermoplastic resin member having a top section extending more than half the length of the member, and a bottom section, the sections of said member being constructed with a front flange, a rear flange parallel to the front flange, a web intersecting the flanges, and a plurality of wire engaging members projecting forwardly from the front flange, the intersecting web extending laterally from the front flange to a short distance beyond the rear flange, the vertical extent and thickness of said web being greater than said flanges and the width of said front flange being greater than said rear flange, the bottom of said web being a point, at least one of said flanges includes an outwardly extending support plate in the bottom section of the member, said integral support plate having a rectangular section and an adjacent trapezoidal section converging towards the nearer end of said flange, the cross-sectional area of said integral support plate being sufficient to support said member in an upright position.

2. The fence post of claim 1 where the relative widths of the rear flange to the front flange are in the range of 0.15 to 0.75.

3. The fence post of claim 1 where the cross-sectional thicknesses of the web and the flanges are in the range of 5/32 inch to 5/16 inch.

4. The fence post of claim 3 where the cross-sectional thicknesses of the flanges are about one-half the cross-sectional thickness of the web.

5. The fence post of claim 1 wherein the thermoplastic resin member is an acid and alkali-resistant material selected from the class of polyolefin resins.

6. The fence post of claim 1 further characterized by having said intregal support plate on said front flange and having the trapezoidal section of said plate at least as long as said rectangular section.

7. The fence post of claim 1 further characterized by having said rear flange terminating at a position in the bottom section of the member no lower than the middle of said integral support plate.

8. A fenced enclosure having fence posts arrayed in a line and wires supported by said posts, the improvement comprising having a majority of said posts in the form of a releasable and reusable injection molded thermoplastic resin member having a top section extending more than half the length of the member, and a bottom section, the sections of said member being constructed with a front flange, a rear flange parallel to the front flange, a web intersecting the flanges, and a plurality of wire engaging members projecting forwardly from the front flange, the intersecting web extending laterally from the front flange to a short distance beyond the rear flange, the vertical extent and thickness of said web being greater than said flanges and the width of said front flange being greater than said rear flange, the bottom of said web being a point, at least one of said flanges includes an outwardly extending support plate in the bottom section of the member, said support plate having a rectangular section and an adjacent trapezoidal section converging towards the nearer end of said flange, the cross-sectional area of said integral support plate being sufficient to support said member in an upright position.

9. The fenced enclosure of claim 8 wherein the wires supported by said posts are electrified.

10. The fenced enclosure of claim 8 wherein the thermoplastic resin member is an acid and alkali-resistant material selected from the class of polyolefin resins.

11. The fenced enclosure of claim 8 wherein said resin member is further characterized by having said integral support plate on said front flange and where the trapezoidal section of said plate is at least as long as said rectangular section.

12. The fenced enclosures of claim 8 wherein said resin member is further characterized by having said rear flange terminating at a position at the bottom section of the member no lower than the middle of said integral support plate.

13. The fenced enclosure of claim 8 wherein said fence posts are arrayed in a line to mark off pasture or feedlot areas.

* * * * *

UNITED STATES PATENT OFFICE
CERTIFICATE OF CORRECTION

Patent No. 4,046,356                Dated September 6, 1977

Inventor(s) Byron W. Rose

It is certified that error appears in the above-identified patent and that said Letters Patent are hereby corrected as shown below:

Column 2, line 27, delete "1 inch" and insert -- 1-1/2" --.

line 28, after "1/4", insert -- inch --.

*Signed and Sealed this*

*Tenth* Day of *January 1978*

[SEAL]

*Attest:*

RUTH C. MASON           LUTRELLE F. PARKER
*Attesting Officer*      *Acting Commissioner of Patents and Trademarks*